(12) United States Patent
Liu

(10) Patent No.: US 10,051,179 B2
(45) Date of Patent: Aug. 14, 2018

(54) PHOTOGRAPHING METHOD, DEVICE AND TERMINAL

(71) Applicant: ZTE CORPORATION, Shenzhen, Guangdong Province (CN)

(72) Inventor: Yongchao Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/316,844

(22) PCT Filed: Aug. 28, 2014

(86) PCT No.: PCT/CN2014/085354
§ 371 (c)(1),
(2) Date: Dec. 7, 2016

(87) PCT Pub. No.: WO2015/188466
PCT Pub. Date: Dec. 17, 2015

(65) Prior Publication Data
US 2017/0126965 A1 May 4, 2017

(30) Foreign Application Priority Data
Jun. 9, 2014 (CN) .......................... 2014 1 0253710

(51) Int. Cl.
*H04N 5/232* (2006.01)
*G06T 11/20* (2006.01)
(Continued)

(52) U.S. Cl.
CPC ....... *H04N 5/23222* (2013.01); *G06T 11/203* (2013.01); *H04N 5/23216* (2013.01);
(Continued)

(58) Field of Classification Search
CPC .......... H04N 5/23222; H04N 5/23216; H04N 5/23293; G06T 11/203; G06F 3/0488; G06F 3/04845; G06F 3/04842
See application file for complete search history.

(56) References Cited

U.S. PATENT DOCUMENTS

| 7,362,367 | B2* | 4/2008 | Soga ................... G03B 13/36 |
| | | | 348/333.02 |
| 7,974,494 | B2* | 7/2011 | Kawamura ........... G06F 3/1454 |
| | | | 345/642 |
| 2014/0226052 | A1* | 8/2014 | Kang ................ H04N 5/23222 |
| | | | 348/333.02 |

FOREIGN PATENT DOCUMENTS

| CN | 101815171 A | 8/2010 |
| CN | 103780823 A | 5/2014 |

(Continued)

*Primary Examiner* — Padma Haliyur
(74) *Attorney, Agent, or Firm* — Ling Wu; Stephen Yang; Ling and Yang Intellectual Property

(57) ABSTRACT

The present document discloses a photographing method, device and terminal. The photographing method includes: in a pre-photographing state, receiving a request of a user for marking a specific photographing area of a photographing preview interface, generating mark information according to the request and displaying the mark information at a corresponding position on the photographing preview interface; in a formal photographing state, displaying image information obtained by a camera and the mark information on the photographing preview interface at the same time; and executing a photographing operation after receiving a photographing instruction.

13 Claims, 10 Drawing Sheets

(51) Int. Cl.
*G06F 3/0484* (2013.01)
*G06F 3/0488* (2013.01)

(52) U.S. Cl.
CPC ....... *H04N 5/23293* (2013.01); *G06F 3/0488* (2013.01); *G06F 3/04842* (2013.01); *G06F 3/04845* (2013.01)

(56) References Cited

FOREIGN PATENT DOCUMENTS

| | | |
|---|---|---|
| JP | 2003-333379 A | 11/2003 |
| JP | 2006121761 A | 5/2006 |
| JP | 2010-141609 A | 6/2010 |
| JP | 2010193049 A | 9/2010 |
| JP | 2010193050 A | 9/2010 |
| JP | 2011010273 A | 1/2011 |
| KR | 20130017440 A | 2/2013 |
| WO | 2014054249 A1 | 4/2014 |

\* cited by examiner

PHOTOGRAPHING METHOD, DEVICE AND TERMINAL

TECHNICAL FIELD

The present document relates to the field of photography, in particular, to a photographing method, device and terminal.

BACKGROUND OF THE RELATED ART

With the improvement of living standards, more and more people have photographic equipments and like photography. At the time of photographing, if a person taking photograph does not carry a tripod, he cannot stand in a photographed picture, and therefore, the person often needs to seek help from others to consign other people to photograph the person himself. However, due to different personal photography techniques and composition preferences, the composition of a picture taken by a consignee is different from the picture effect that the person himself wants.

SUMMARY OF THE INVENTION

An embodiment of the present document provides a photographing method, device and terminal, to solve a problem that a picture taken by a consignee cannot reach an expected effect when photographing is consigned to other people in the related art.

An embodiment of the present document provides a photographing method, including: in a pre-photographing state, receiving a request of a user for marking a specific photographing area of a photographing preview interface, generating mark information according to the request and displaying the mark information at a corresponding position on the photographing preview interface; in a formal photographing state, displaying image information obtained by a camera and the mark information on the photographing preview interface at the same time; and executing a photographing operation after receiving a photographing instruction.

In an embodiment of the present document, the receiving the request of the user for marking the specific photographing area of the photographing preview interface includes: receiving touch information of the user touching a terminal display screen on the photographing preview interface;

the generating the mark information according to the request and displaying the mark information at the corresponding position on the photographing preview interface includes: generating the mark information according to the touch information of the user on the terminal display screen, and displaying the mark information at a position touched by the user on the photographing preview interface.

In an embodiment of the present document, when the touch information includes a mark graphic selected by the user and a position where the user places the mark graphic, the generating the mark information according to the request and displaying the mark information at the corresponding position on the photographing preview interface includes: taking the mark graphic selected by the user as the mark information, and displaying the mark graphic at the position where the user places the mark graphic on the photographing preview interface;

when the touch information includes a touch track by the user on the terminal display screen, the mark information is generated and displayed at the corresponding position on the photographing preview interface using one of following manners:

taking the touch track as the mark information, and displaying the mark information at a position touched by the user on the photographing preview interface; or determining a touch selection area of the user according to the touch track by the user on the terminal display screen; extracting first feature information of an image displayed in the touch selection area of the user, generating the mark information according to the first feature information, and displaying the mark information at the position touched by the user on the photographing preview interface.

In an embodiment of the present document, the receiving the request of the user for marking the specific photographing area of the photographing preview interface includes: receiving a request of the user freezing image information obtained by a camera;

the generating the mark information according to the request and displaying the mark information at the corresponding position on the photographing preview interface includes: freezing the image information obtained by the camera according to the request, obtaining second feature information from the frozen image information, generating the mark information according to the second feature information, and displaying the mark information at the corresponding position on the photographing preview interface.

In an embodiment of the present document, after displaying the image information obtained by the camera and the mark information on the photographing preview interface at the same time and before receiving the photographing instruction, the method further includes: calculating an overlap ratio between an image in the specific photographing area in an image obtained by the camera and the mark information, and informing the user of executing photographing or triggering a terminal to start photographing when a value of the overlap ratio exceeds a preset value.

An embodiment of the present document further provides a photographing device, including: a request receiving module, a mark generating module, a mark display module, an image display module and a photographing module; the request receiving module is arranged to, in a pre-photographing state, receive a request of a user for marking a specific photographing area of a photographing preview interface; the mark generating module is arranged to generate mark information according to the request; the mark display module is arranged to display the mark information at a corresponding position on the photographing preview interface in both the pre-photographing state and a formal photographing state; the image display module is arranged to display image information obtained by a camera on the photographing preview interface; and the photographing module is arranged to execute a photographing operation after receiving a photographing instruction.

In an embodiment of the present document, the request receiving module includes a touch information receiving submodule arranged to receive touch information of the user touching a terminal display screen on the photographing preview interface; the mark generating module includes a touch mark generating submodule arranged to generate the mark information according to the touch information of the user on the terminal display screen; the mark display module includes a touch mark display submodule arranged to display the mark information at a position touched by the user on the photographing preview interface.

In an embodiment of the present document, the touch mark generating submodule includes a graphic mark generating submodule, a track mark generating submodule or a first feature mark generating submodule; the touch mark display submodule correspondingly includes a graphic mark display submodule, a track mark display submodule or a first feature mark display submodule;

the graphic mark generating submodule is arranged to take a mark graphic selected by the user as the mark information when the touch information includes the mark graphic selected by the user and a position where the user places the mark graphic; the graphic mark display submodule is arranged to display the mark graphic at the position where the user places the mark graphic on the photographing preview interface;

the track mark generating submodule is arranged to take a touch track as the mark information when the touch information includes the touch track by the user on the terminal display screen; the track mark display submodule is arranged to display the mark information at a position touched by the user on the photographing preview interface;

the first feature mark generating submodule is arranged to, when the touch information includes the touch track by the user on the terminal display screen, determine a touch selection area of the user according to the touch track by the user on the terminal display screen, extract first feature information of an image displayed in the touch selection area of the user, and generate mark information according to the first feature information; the first feature mark display submodule is arranged to display the mark information at the position touched by the user on the photographing preview interface.

In an embodiment of the present document, the request receiving module includes a freeze request receiving submodule, the freeze request receiving submodule is arranged to receive a request of the user freezing image information obtained by a camera;

the mark generating module includes a second feature mark generating submodule arranged to freeze the image information obtained by the camera according to the request, obtain second feature information from the frozen image information, and generate the mark information according to the second feature information; the mark display module includes a second feature mark display submodule arranged to display the mark information at the corresponding position on the photographing preview interface.

In an embodiment of the present document, the device further includes a calculating module arranged to calculate an overlap ratio between an image in the specific photographing area in an image obtained by the camera and the mark information, and inform the user of executing photographing or triggering a terminal to start photographing when a value of the overlap ratio exceeds a preset value.

The present document further provides a photographing terminal, including a receiving module, a processing module, a display module and an image obtaining module; the image obtaining module is arranged to obtain image information; the display module is arranged to display the image information on a photographing preview interface; the receiving module is arranged to receive a request of a user for marking a specific photographing area of the photographing preview interface, and send the request to the processing module after receiving the request; the processing module is arranged to generate mark information according to the request, and send the mark information to the display module; the display module is further arranged to display the mark information at a corresponding position on the photographing preview interface; the receiving module is further arranged to receive a photographing instruction, and inform the processing module of executing a photographing operation after receiving the photographing instruction.

In an embodiment of the present document, the receiving module includes a touch receiving submodule; the display module includes a touch display screen, the touch receiving submodule is arranged to receive touch information of the user touching the touch display screen on the photographing preview interface; the processing module is arranged to generate the mark information according to the touch information of the user on the touch display screen and send the mark information to the display module; and the display module is arranged to display the mark information at a position touched by the user on the photographing preview interface.

The photographing method provided by embodiments of the present document, before formally photographing, receives the request of the user for marking the specific photographing area of the photographing preview interface, generates the mark information according to the request and displays the mark information at the corresponding position on the photographing preview interface; in the formal photographing state, enables a person to whom photographing is consigned, by displaying the image information obtained by a camera and the mark information on the photographing preview interface at the same time, to know a position where a consignor wants to place an image according to the mark information, so as to photograph a scene to be photographed according to a consignor's intention, thereby making the photographed image conform to an expected effect of the consignor.

PREFERRED EMBODIMENTS OF THE INVENTION

A photographing method proposed by an embodiment of the present document includes: a user marks a specific photographing area on a photographing preview interface in a pre-photographing state; a terminal generates mark information according to a request after receiving the request of the user for marking the specific photographing area of the photographing preview interface, and displays the mark information at a corresponding position on the photographing preview interface; and the user photographs an image obtained by a camera according to the mark information in a formal photographing state. Herein the pre-photographing state and the formal photographing state are both states after the terminal enters a photographing mode, and the distinction between the pre-photographing state and the formal photographing state is in that: the pre-photographing state refers to a state of the terminal when the user marks the specific photographing area, while the formal photographing state refers to a state of the terminal when the user prepares to photograph image information obtained by the camera according to the mark information. The photographing preview interface is an interface for displaying the image information obtained by the camera in real time. The specific photographing area not only includes an area specified and marked by the user but also includes an area with relatively prominent features in an image obtained by the camera.

The above-described photographing method, device and terminal will be described below with reference to specific embodiments, the embodiments of the present document and the features of the embodiments may be arbitrarily combined with each other without collision.

Embodiment 1

Figure 1:
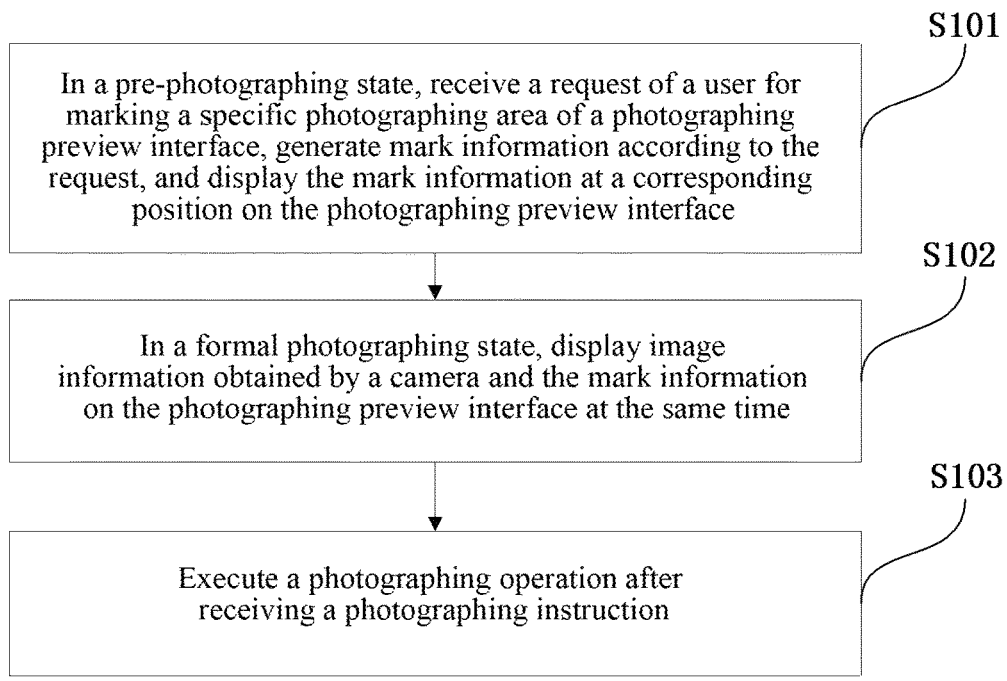
FIG. 1 is a flow chart of a photographing method provided in Embodiment 1 of the present document.

Embodiment 1 provides a photographing method. Referring to FIG. 1, FIG. 1 is a flow chart of the photographing method, and the method includes:

In step S101, in a pre-photographing state, a request of a user for marking a specific photographing area of a photographing preview interface is received, and mark information is generated according to the request and is displayed at a corresponding position on the photographing preview interface;

In step S102, in a formal photographing state, image information obtained by a camera and the mark information are displayed on the photographing preview interface at the same time;

In step S103, a photographing operation is executed after receiving a photographing instruction.

The photographing method proposed in the present embodiment is mainly to enable a consignee to execute photographing in accordance with a consignor's intention when photographing is consigned to other people. Therefore, the user in the above step S101 generally refers to the consignor. The user, according to his own preference, first selects a background to be photographed and a photographing position, adjusts the camera's viewfinder, arranges framing and composition, and then marks the specific photographing area of the photographing preview interface. The specific photographing area may be specified by the user and also may be determined through an algorithm and other manners by a terminal. The terminal generates corresponding mark information according to the request after receiving the request of the user for marking the specific photographing area of the photographing preview interface and displays the mark information at the corresponding position on the photographing preview interface. In step S102, the terminal displays the image information obtained by the camera and the mark information on the photographing preview interface at the same time. The image information obtained by the camera will be changed according to the movement of the camera, while the shape and position of the mark information displayed on the photographing preview interface will not be changed unless the user modifies them. The purpose of the terminal displaying the image information obtained by the camera and the set mark information on the photographing preview interface at the same time is to allow the consignee to clearly understand the consignor's intention of photographing composition, the consignee only needs to place various specific areas in an image obtained by the camera at the corresponding mark information and then execute photographing, the composition of a picture taken by the consignee will be consistent with the composition required by the consignor.

In the above step S103, after the photographing operation is executed, a stored photographed image does not contain the mark information. Alternatively, after the photographing is completed, the mark information displayed on the photographing preview interface may also be cleared.

In the above step S101, in the photographing preview interface, the user may realize the request for marking the specific photographing area of the photographing preview interface by touching a terminal display screen. At this time, receiving the request of the user for marking the specific photographing area of the photographing preview interface includes: receiving touch information of the user touching the terminal display screen on the photographing preview interface. After the terminal receives the touch information of the user on the photographing preview interface, the terminal may generate the mark information according to the touch information of the user on the terminal display screen, and display the mark information at a position touched by the user on the photographing preview interface.

Alternatively, as different touches by the user on the terminal display screen exist, the touch information, of the user touching the terminal display screen, received by the terminal is also different, for example, when a touch by the user on the terminal display screen is to draw a graphic (for example, graffiti) on the display screen, the touch information includes a touch track by the user on the terminal display screen; if there is a draggable mark graphic on the photographing preview interface, the user also needs to touch the terminal display screen when dragging the mark graphic, at this time, the touch by the user on the terminal display screen is to drag the graphic on the terminal display screen, and the touch information includes the mark graphic selected by the user and a position where the user places the mark graphic (that is, a position where the user stops dragging the mark graphic).

Figure 2A:
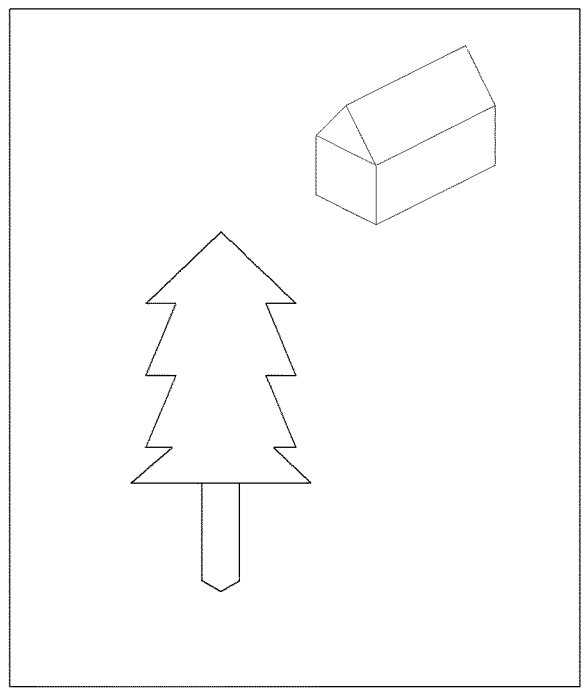
FIG. 2a is a schematic diagram of an image displayed by photographing a preview interface in a pre-photographing state, in a photographing method provided in Embodiment 1 of the present document.
Figure 2B:
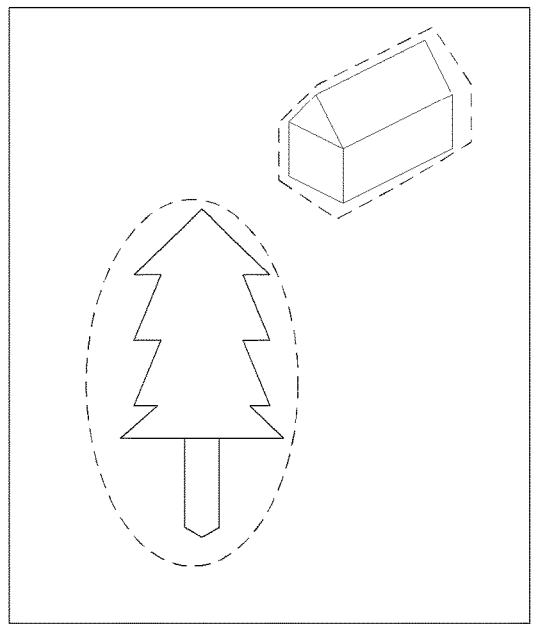
FIG. 2b is a schematic diagram of a photographing preview interface after a user draws a graphic at a specific photographing area in a pre-photographing state, in a photographing method provided in Embodiment 1 of the present document.
Figure 2C:
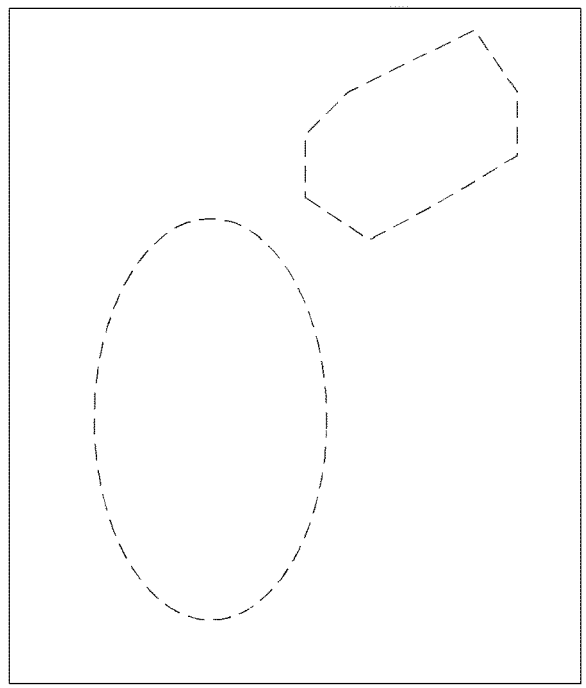
FIG. 2c is a schematic diagram of mark information displayed in a terminal, in a photographing method provided in Embodiment 1 of the present document.
Figure 2D:
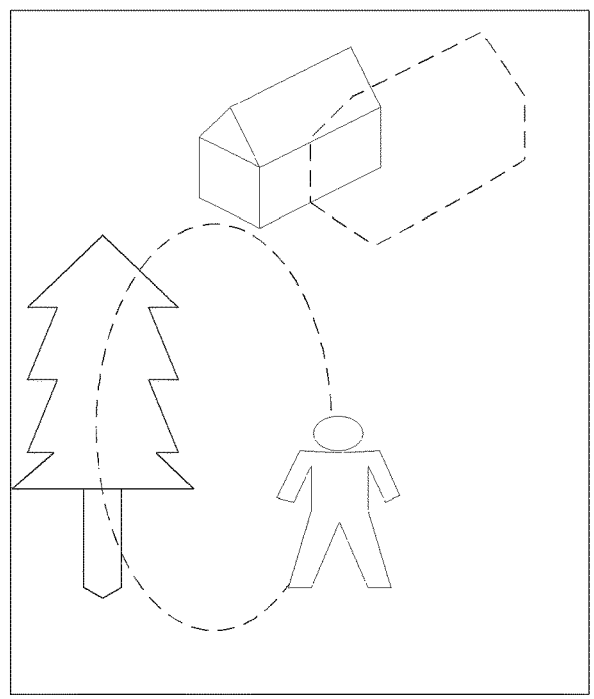
FIG. 2d is a schematic diagram of a photographing preview interface of a terminal for displaying image information obtained by a camera and mark information in a formal photographing state at the same time, in a photographing method provided in Embodiment 1 of the present document.
Figure 2E:
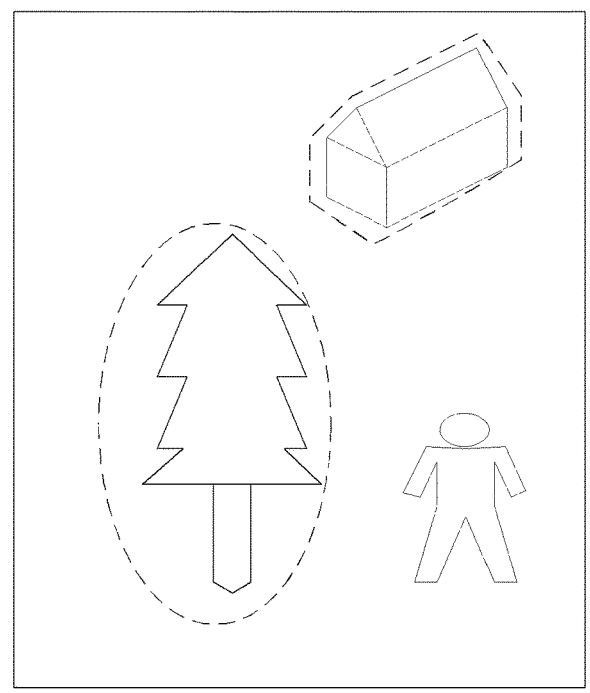
FIG. 2e is a schematic diagram of another photographing preview interface of a terminal for displaying image information obtained by a camera and mark information in a formal photographing state at the same time, in a photographing method provided in Embodiment 1 of the present document.
Figure 2F:
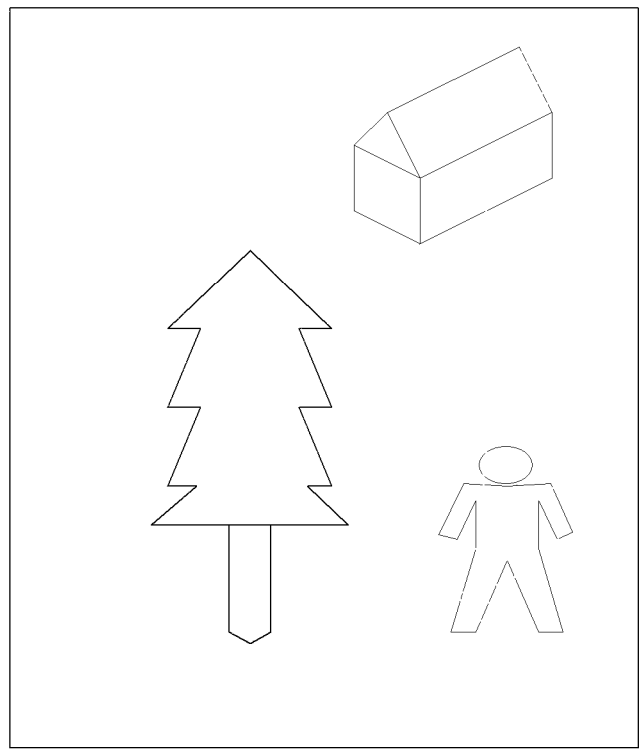
FIG. 2f is a schematic diagram of image information photographed by a terminal after photographing is completed, in a photographing method provided in Embodiment 1 of the present document.

When the touch information includes a touch track by the user on the terminal display screen, the mark information may be generated directly according to the touch track and displayed on the photographing preview interface, for example, the touch track by the user on the display screen is extracted, the touch track is taken as the mark information, the mark information is displayed at the position touched by the user on the photographing preview interface. To better describe this method, an illustrative example is used to describe the method in the following: referring to FIG. 2a, a main image displayed in the photographing preview interface is a tree and a house, the user marks a specific photographing area by drawing a graphic on the display screen, here, the specific photographing area is an area, of the tree and the house, specified by the user. Referring to dashed lines in FIG. 2b, the user draws an ellipse around the tree according to a feature of the tree, and draws an irregular graphic according to a shape of the house. After receiving the touch information of the user, the terminal extracts the touch track by the user on the display screen, that is, the ellipse and the irregular graphic, and takes the touching track as the mark information and displays the mark information at the corresponding position on the photographing preview interface. Referring to FIG. 2c, FIG. 2c is a display of two pieces of the mark information on the photographing preview interface. When the user gives the camera to the consignee and stands in a scene to be photographed, the consignee aligns the camera to the scene to be photographed, at this time, the tree and the house are not in the mark information, referring to FIG. 2d, and such photographing composition does not conform to the consignor's intention. The consignee then adjusts an angle of the camera until the tree and the house are in the mark information respectively, as shown in FIG. 2e, the consignee then presses an shutter and executes a photographing operation, after the photographing is completed, a photographed image is obtained, referring to FIG. 2f, the mark information is not included in the photographed image.

Figure 3A:
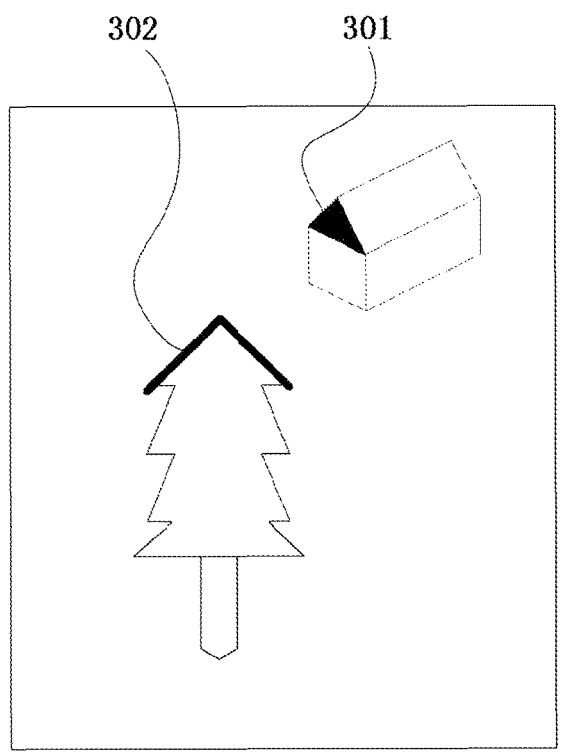
FIG. 3a is a schematic diagram of a photographing preview interface after a terminal obtains feature information at a specific photographing area, in another photographing method provided in Embodiment 1 of the present document.
Figure 3B:
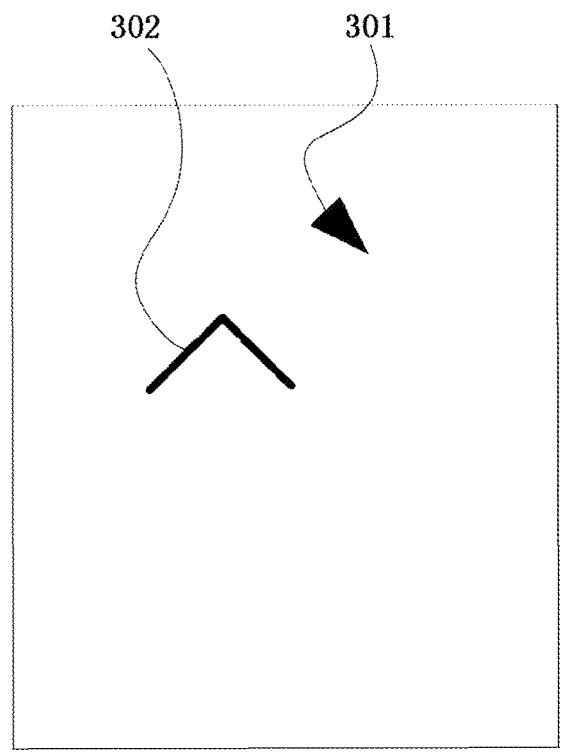
FIG. 3b is a schematic diagram of mark information displayed in a terminal, in another photographing method provided in Embodiment 1 of the present document.

When the touch information includes the touch track by the user on the terminal display screen, in order to more quickly set the mark information, the terminal may also be enabled to automatically set the mark information, for example, a touch selection area of the user is determined according to the touch track by the user on the terminal display screen; first feature information of an image displayed in the touch selection area of the user is extracted, the mark information is generated according to the first feature information, the mark information is placed at the position touched by the user on the photographing preview interface. The first feature information represents relatively prominent information of the image displayed in the touch selection area of the user, such information represents the feature of the image in the area, for example, peak points of some objects in the area, outlines of some objects and so on. For example, a black triangle 301 on a roof of the house in FIG. 3a is the feature information of the roof of the house, and an irregular shape 302 on the tree is the feature information of an outline of the top of the tree, after extracting such feature information, the terminal generates mark information therefrom and displays the mark information on the photographing preview interface, FIG. 3b is a display of two pieces of the mark information on the photographing preview interface.

Figure 4A:
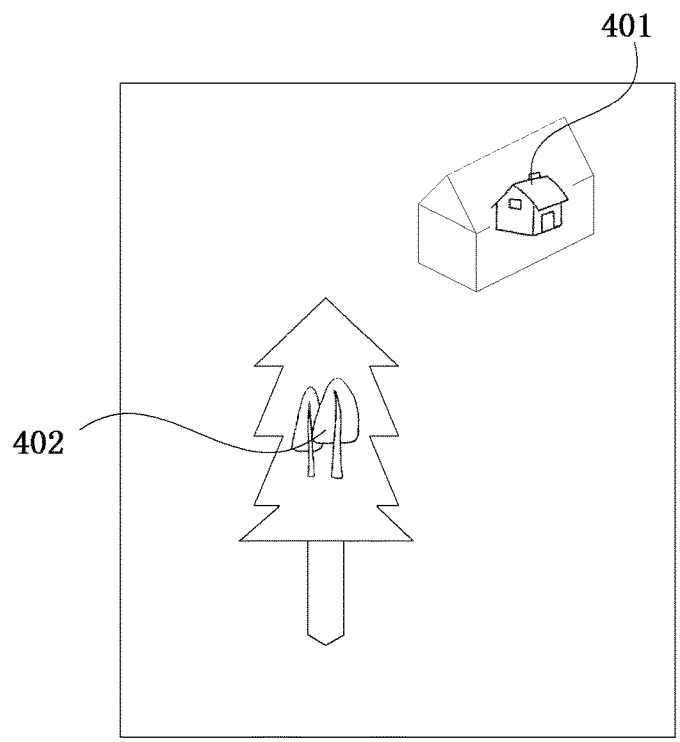
FIG. 4a is a schematic diagram of a photographing preview interface after a user places a mark graphic at a specific photographing area, in another photographing method provided in Embodiment 1 of the present document.
Figure 4B:
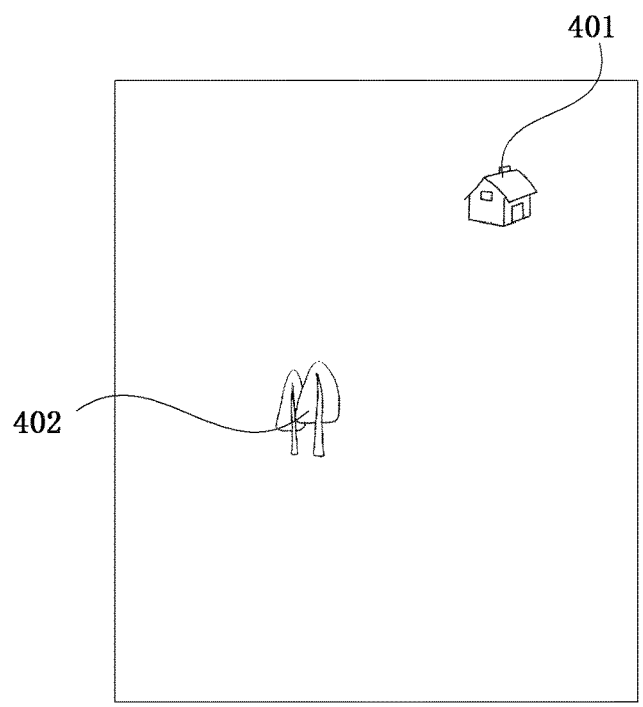
FIG. 4b a schematic diagram of is mark information displayed in a terminal, in another photographing method provided in Embodiment 1 of the present document.

When the touch information includes the mark graphic selected by the user and a position where the user places the mark graphic, the mark graphic selected by the user may be taken as the mark information, and the mark graphic is displayed at a position where the user places the mark graphic on the photographing preview interface. The mark graphics are graphics that already exist in the terminal, and these graphics may be geometric graphs or may be some images representing specific objects, such as a mountain, a house, a cat, a person, and so on. If the user needs to mark a position of a mountain on the photographing preview interface, he may put a mark graphic representing the mountain at a position corresponding to the mountain on the preview interface, for example, the house mark graphic 401 and the tree mark graphic 402 in FIG. 4a. The user places the selected house mark graphic 401 in an area where the house is displayed on the photographing preview interface and places the selected tree mark graphic 402 in an area where the tree is displayed, the terminal displays these mark graphics as mark information at a corresponding position on the preview interface, FIG. 4b is a display of two pieces of the mark information on the photographing preview screen. It can be seen that such marking manner is very simple, and a meaning thereof is clear, after the user performs marking in this way, the commissioned person can explicitly learn the user's desired composition when the user commissions other people to execute photographing.

In the above step S101, the request of the user for marking the specific photographing area of the photographing preview interface may also be a request of the user for freezing the image information obtained by the camera. That is to say, in the photographing preview interface, the user may send the request for marking the specific photographing area of the photographing preview interface in a manner that freezes the image information obtained by the camera. For this case, displaying the mark information at the corresponding position on the photographing preview interface according to the request includes: obtaining second feature information from the frozen image information, generating the mark information according to the second feature information, and displaying the mark information at a corresponding position on the photographing preview interface. In the present embodiment, the first feature information and the second feature information are essentially the same, and are feature information of some objects in the image. The first feature information is distinct from the second feature information in that the first feature information is feature information extracted from an area selected by the user, while the second feature information is feature information which is extracted from the entire picture frozen by the user.

In order to make the photographing more intelligent, an automatic overlap contrast may also be set in the terminal, that is to say, after displaying the image information obtained by the camera and the mark information on the photographing preview interface at the same time and before receiving a photographing instruction, an overlap ratio between an image in the specific photographing area in an image obtained by the camera and the mark information is calculated, the user is informed that photographing is executed or the terminal is triggered to start photographing when a value of the overlap ratio exceeds a preset value. The overlap ratio is required to be calculated according to the setting of the mark information, for example, if the mark information is an outline of a mountain peak, calculation of the overlap ratio is to calculate a overlap ratio between the outline of the mountain peak in the image obtained by the camera and the outline of the mark information.

In the present embodiment, the user may also display word information describing the marked photographing area next to the mark information to enable the consignee to clearly understand the composition intention of the consignor after marking the specific photographing area with the graphic. For example, the word "mountain" is displayed adjacent to the mark information of the mountain.

In order to make the composition more ideal, when marking, the user may also cooperate with his companion to allow his companion to temporarily stand in a picture to be photographed to find the best photographing position, and then mark an area where the companion stands on the photographing preview interface, after the terminal is handed over to the consignee, the consignor moves to a position where a person is marked on the photographing preview interface. Therefore, the consignee may take a picture more in line with the consignor's composition requirements.

Embodiment 2

Figure 5:
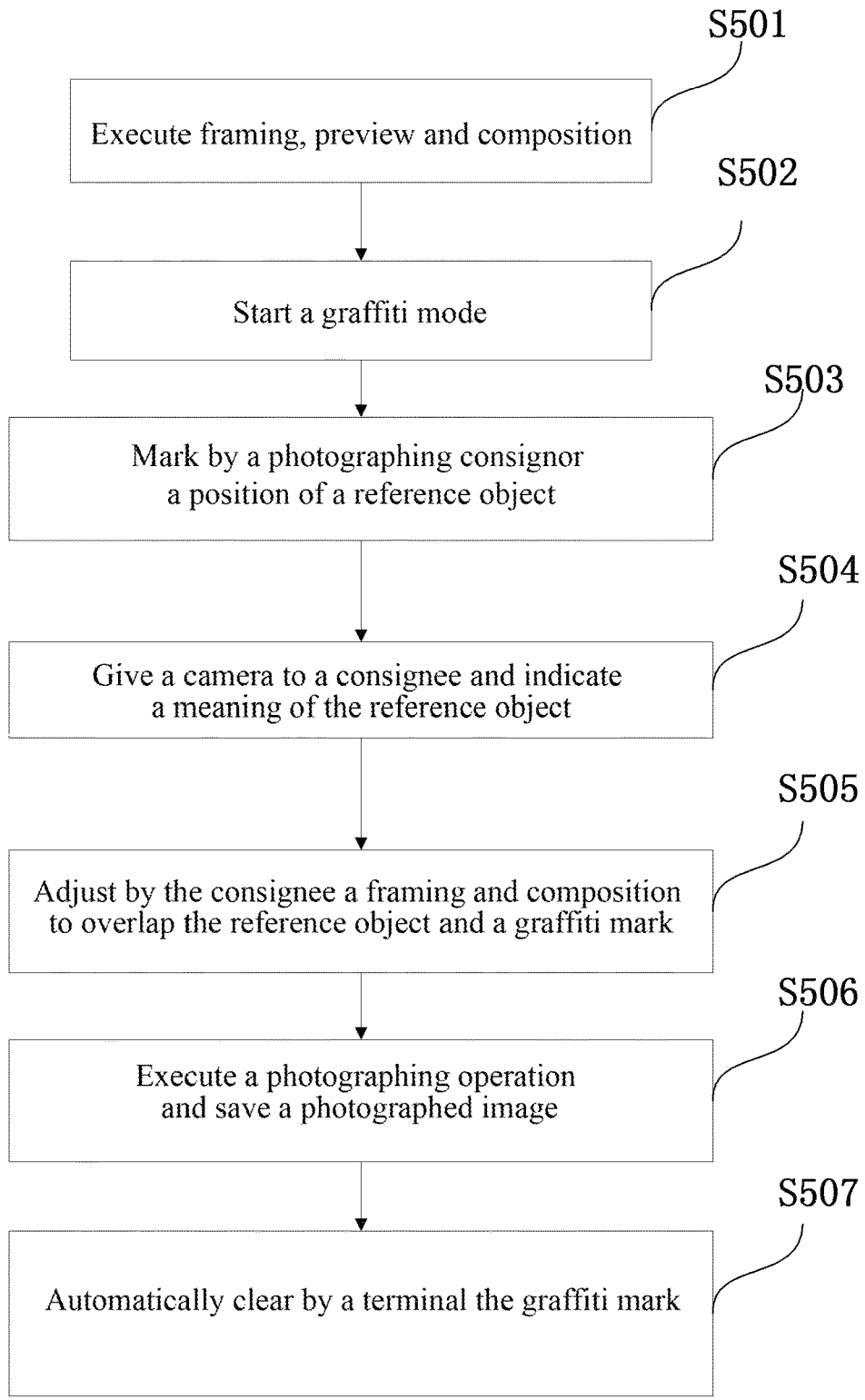
FIG. 5 is a flow chart of a photographing method provided in Embodiment 2 of the present document.

Embodiment 2 provides a more detailed photographing method, in the embodiment, the specific photographing area takes a reference object as an example, and the user marks the specific photographing area with graffiti. Referring to FIG. 5, the method includes the following steps:

In step S501, framing, preview and composition are executed, a background to be photographed and a photographing position are first selected by a photographing consignor, a camera's viewfinder is adjusted, and the framing and composition is arranged.

In step S520, a graffiti mode is started, the consignor starts the graffiti mode and prepares to mark a position of a reference object.

In Step S503, the photographing consignor marks the position of the reference object, selects an object with an obvious feature in the viewfinder as the reference object after the consignor is satisfied with the current framing and composition, and draws by hands the features and outlines thereof, for example, easily marked and identified objects such as an outline of a mountain peak, a column of a gatehouse, a head of a person, and so on.

In step S504, the camera is given to a consignee, and the consignor expresses a meaning of the reference object, and then the consignee and the consignor arrive at preset places respectively.

In step S505, the framing and composition is adjusted by the consignee to overlap the reference object and the graffiti mark. As long as the reference object is appropriately selected, the reference object overlaps with the graffiti mark, and then the current framing and composition is almost coincident with willingness of the photographing consignor at that time.

In step S506, a photographing operation is executed and a photographed image is stored.

In step S507: a terminal automatically clears the graffiti mark.

Embodiment 3

Figure 6:
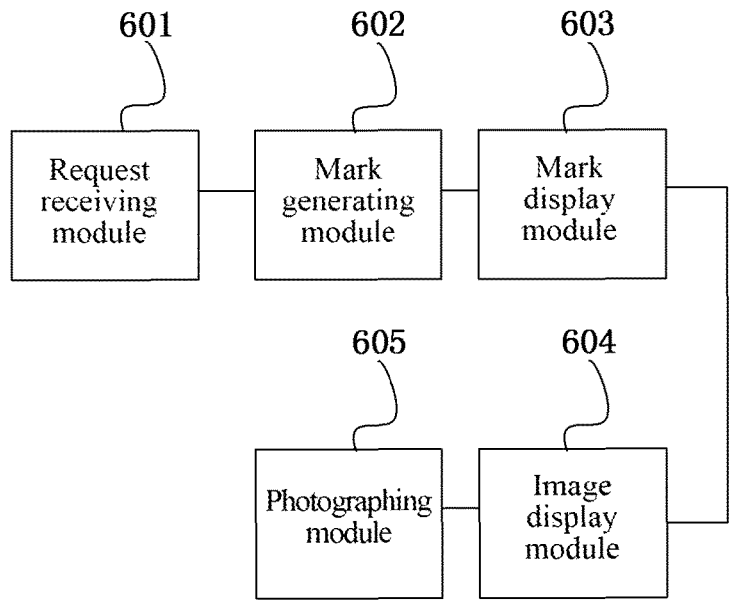
FIG. 6 is a schematic structural diagram of a photographing device provided in Embodiment 3 of the present-document.

Embodiment 3 provides a photographing device, referring to FIG. 6, FIG. 6 is a schematic structural diagram of the photographing device, the device includes a request receiving module 601, a mark generating module 602, a mark display module 603, an image display module 604 and a photographing module 605; the request receiving module 601 is arranged to receive a request of a user for marking a specific photographing area of a photographing preview interface in a pre-photographing state; the mark generating module 602 is arranged to generate mark information according to the request; the mark display module 603 is arranged to display the mark information at a corresponding position on the photographing preview interface in both the pre-photographing state and a formal photographing state; the image display module 604 is arranged to display image information obtained by a camera on the photographing preview interface; the photographing module 605 is arranged to execute a photographing operation after receiving a photographing instruction.

Figure 7:
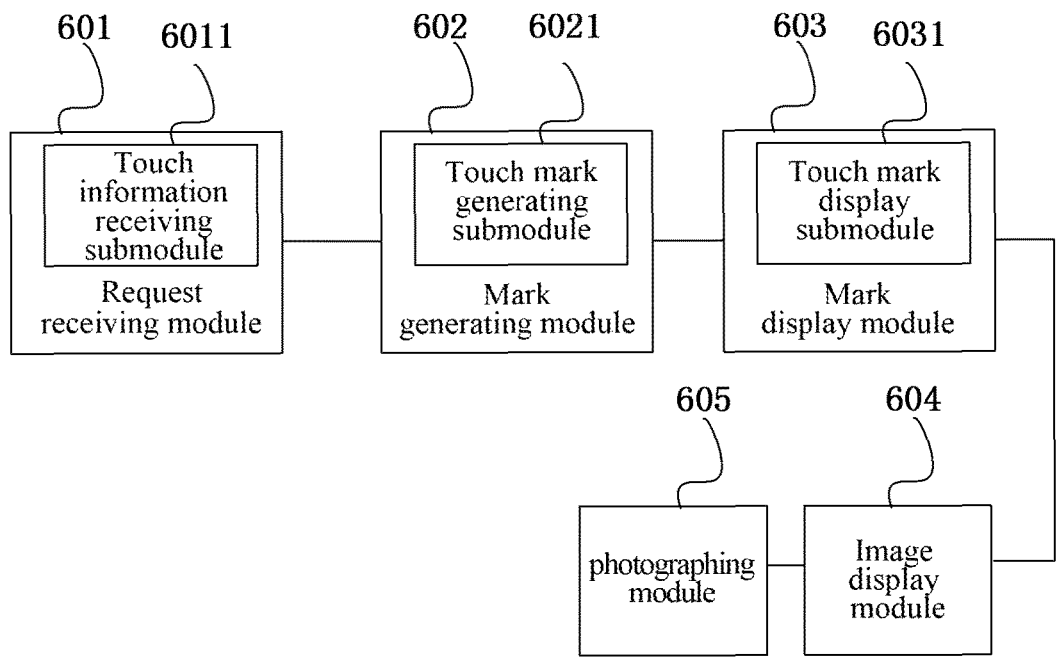
FIG. 7 is a schematic structural diagram of another photographing device provided in Embodiment 3 of the present document.

Embodiment 3 further provides another photographing device, referring to FIG. 7, FIG. 7 is a schematic structural diagram of the photographing device, the device includes various modules of the above device. The request receiving module 601 includes a touch information receiving submodule 6011 arranged to receive touch information of the user touching a terminal display screen on the photographing preview interface; the mark generating module 602 includes a touch mark generating submodule 6021 arranged to generate the mark information according to the touch information of the user on the terminal display screen; the mark display module 603 includes a touch mark display submodule 6031 arranged to display the mark information at a position touched by the user on the photographing preview interface.

Alternatively, the touch mark generating submodule 6021 includes a graphic mark generating submodule, a track mark generating module or a first feature mark generating submodule; the touch mark display submodule correspondingly includes a graphic mark display submodule, a track mark display module or a first feature mark display submodule; the graphic mark generating submodule is arranged to take a mark graphic selected by the user as the mark information when the touch information includes the mark graphic selected by the user and a position where the user places the mark graphic; the graphic mark display submodule is arranged to display the mark graphic at the position where the user places the mark graphic on the photographing preview interface; the track mark generating submodule is arranged to take the touch track as the mark information when the touch information includes the touch track by the user on the terminal display screen; the track mark display submodule is arranged to display the mark information at a position touched by the user on the photographing preview interface; the first feature mark generating submodule is arranged to, when the touch information includes the touch track by the user on the terminal display screen, determine a touch selection area of the user according to the touch track by the user on the terminal display screen, extract first feature information of an image displayed in the touch selection area of the user, and generate the mark information according to the first feature information; the first feature mark generating submodule is arranged to display the mark information at the position touched by the user on the photographing preview interface.

Figure 8:
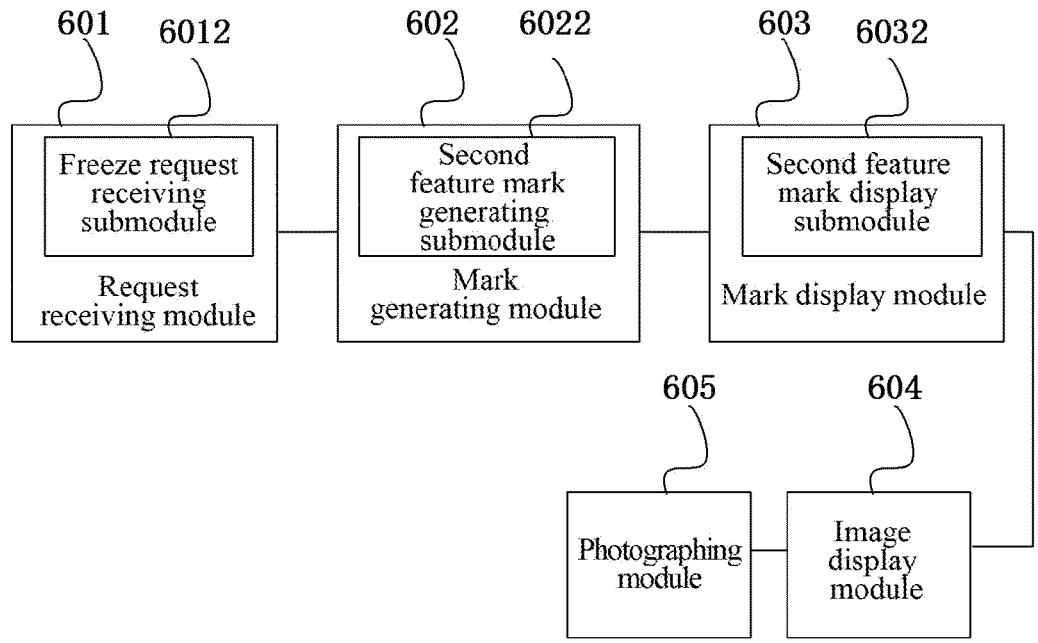
FIG. 8 is a schematic structural diagram of another photographing device provided in Embodiment 3 of the present document.

Embodiment 3 further provides another photographing device, referring to FIG. 8, FIG. 8 is a schematic structural diagram of the photographing device, the device includes various modules in the device shown in the above FIG. 6. The request receiving module 601 includes a freeze request receiving submodule 6012, the freeze request receiving submodule 6012 is arranged to receive the request of the user freezing image information obtained by a camera; the mark generating module 602 includes a second feature mark generating submodule 6022 arranged to freeze the image information obtained by the camera according to the request, obtain second feature information from the frozen image information, and generate the mark information according to the second feature information; the mark display module 603 includes a second feature mark display submodule 6032 arranged to display the mark information at a corresponding position on the photographing preview interface.

Figure 9:
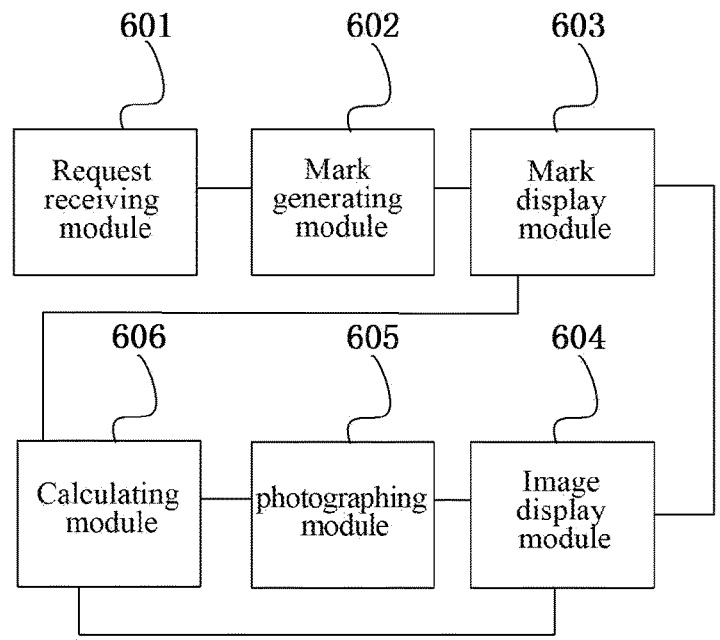
FIG. 9 is a schematic structural diagram of another photographing device provided in Embodiment 3 of the present document.

Embodiment 3 further provides another photographing device, referring to FIG. 9, FIG. 9 is a schematic structural diagram of the photographing device, the device includes various modules in the device shown in the above FIG. 6, the device further includes a calculating module 606 arranged to calculate an overlap ratio between an image in the specific photographing area in an image obtained by the camera and the mark information, and inform the user of executing photographing or triggering a terminal to start photographing when a value of the overlap ratio exceeds a preset value.

Embodiment 4

Figure 10:
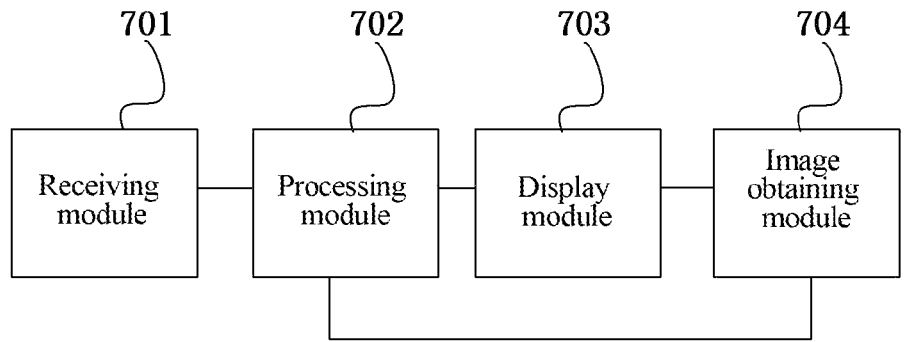
FIG. 10 is a schematic structural diagram of a photographing terminal provided in Embodiment 4 of the present document.

Embodiment 4 provides a photographing terminal, referring to FIG. 10, FIG. 10 is a schematic structural diagram of the photographing terminal, the terminal includes a receiving module 701, a processing module 702, a display module 703 and an image obtaining module 704; the image obtaining module 704 is arranged to obtain image information; the display module 703 is arranged to display the image information on a photographing preview interface; the receiving module 701 is arranged to receive a request of a user for marking a specific photographing area of the photographing preview interface; the receiving module 701 sends the request to the processing module 702 after receiving the request, the processing module 702 generates mark information according to the request and sends the mark information to the display module 703; the display module 703 displays the mark information at a corresponding position on the photographing preview interface; the receiving module 701 is further arranged to receive a photographing instruction and inform the processing module 702 of executing a photographing operation after receiving the photographing instruction.

Figure 11:
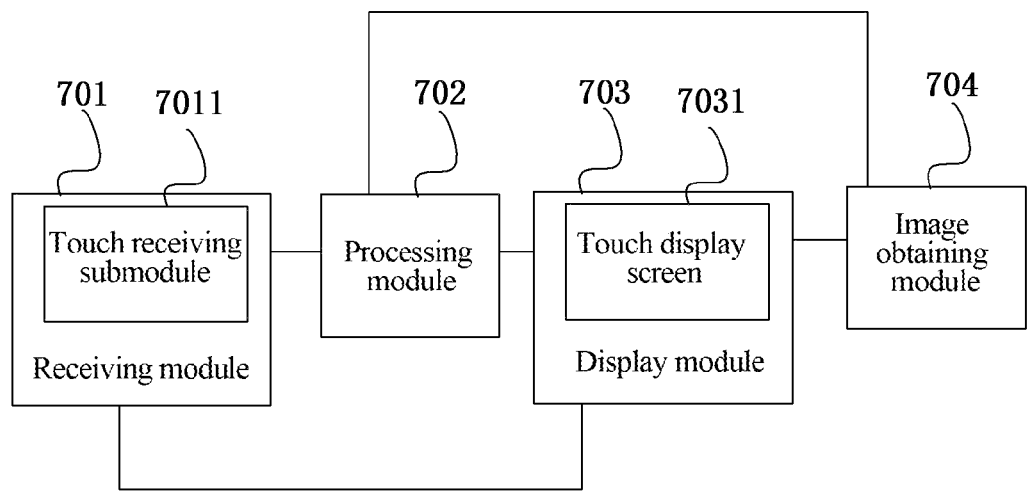
FIG. 11 is a schematic structural diagram of another photographing terminal provided in Embodiment 4 of the present document.

Embodiment 4 further provides another photographing device, referring to FIG. 11, FIG. 11 is a schematic structural diagram of the photographing terminal, the device includes various modules in the terminal shown in the above FIG. 10, the receiving module 701 includes a touch receiving submodule 7011; the display module 703 includes a touch display screen 7031; the touch receiving submodule 7011 is arranged to receive touch information of the user touching the touch display screen 7031 of the terminal on the photographing preview interface; the processing module 702 is arranged to generate the mark information according to the touch information of the user on the touch display screen 7031 of the terminal, and send the mark information to the display module 703; the display module 703 displays the mark information at a position touched by the user on the photographing preview interface.

It will be understood by one skilled in the art that all or a portion of the steps in the above-described methods and the above-described function modules can be completed by relevant hardware instructed by a program, and the above program can be stored in a computer-readable storage medium such as a read only memory, a magnetic disk, or an optical disk, and the like. Alternatively, all or a portion of the steps of the embodiments described above can also be implemented using one or more integrated circuits. Correspondingly, each module/unit in the above-described embodiments can be implemented in the form of hardware or in the form of a software function module. The present document is not limited to a combination of hardware and software in any specific form.

The foregoing contents are further detailed descriptions of the present document in conjunction with the specific embodiments, but specific implementations of the present document should not be construed as being limited to these descriptions. It will be apparent to one skilled in the art to which the present document pertains that several simple deductions or substitutions can also be made without departing from the conception of the present document and shall be included in the protection scope of the present document.

INDUSTRIAL APPLICABILITY

The embodiments of the present document are capable of photographing a scene to be photographed in accordance with the consignor's intention, so that the photographed image conforms to the expected effect of the consignor.

What I claim is:

1. A photographing method, comprising:
in a pre-photographing state, receiving a request of a user for marking a specific photographing area of a photographing preview interface, generating mark information according to the request and displaying the mark information at a corresponding position on the photographing preview interface;
in a formal photographing state, displaying image information obtained by a camera and the mark information on the photographing preview interface at the same time; and executing a photographing operation after receiving a photographing instruction,
wherein, the method of receiving the request of the user for marking the specific photographing area of the photographing preview interface comprises: receiving touch information of the user touching a terminal display screen on the photographing preview interface; and
the method of generating the mark information according to the request and displaying the mark information at the corresponding position on the photographing preview interface comprises: generating the mark information according to the touch information of the user on the terminal display screen, and displaying the mark information at a position touched by the user on the photographing preview interface, when the touch information comprises a touch track by the user on the terminal display screen, the mark information is generated and displayed at the corresponding position on the photographing preview interface using one of following manners:

taking the touch track as the mark information, and displaying the mark information at a position touched by the user on the photographing preview interface; or determining a touch selection area of the user according to the touch track by the user on the terminal display screen; extracting first feature information of an image displayed in the touch selection area of the user, generating the mark information according to the first feature information, and displaying the mark information at the position touched by the user on the photographing preview interface.

2. The photographing method according to claim 1, wherein, when the touch information comprises a mark graphic selected by the user and a position where the user places the mark graphic, the method of generating the mark information according to the request and displaying the mark information at the corresponding position on the photographing preview interface comprises:

taking the mark graphic selected by the user as the mark information, and displaying the mark graphic at the position where the user places the mark graphic on the photographing preview interface.

3. The photographing method according to claim 1, wherein, the method of receiving the request of the user for marking the specific photographing area of the photographing preview interface comprises: receiving a request of the user freezing image information obtained by a camera;

the method of generating the mark information according to the request and displaying the mark information at the corresponding position on the photographing preview interface comprises: freezing the image information obtained by the camera according to the request, obtaining second feature information from the frozen image information, generating the mark information according to the second feature information, and displaying the mark information at the corresponding position on the photographing preview interface.

4. The photographing method according to claim 1, wherein, after displaying the image information obtained by the camera and the mark information on the photographing preview interface at the same time and before receiving the photographing instruction, the method further comprises: calculating an overlap ratio between an image in the specific photographing area in an image obtained by the camera and the mark information, and informing the user of executing photographing or triggering a terminal to start photographing when a value of the overlap ratio exceeds a preset value.

5. A photographing device, comprising hardware performing instructions stored in a non-transitory computer readable medium which executes steps in following modules;

a request receiving module arranged to, in a pre-photographing state, receive a request of a user for marking a specific photographing area of a photographing preview interface;

a mark generating module arranged to generate mark information according to the request;

a mark display module arranged to display the mark information at a corresponding position on the photographing preview interface in both the pre-photographing state and a formal photographing state;

an image display module arranged to display image information obtained by a camera on the photographing preview interface; and a photographing module arranged to execute a photographing operation after receiving a photographing instruction, wherein, the request receiving module comprises a touch information receiving submodule arranged to receive touch information of the user touching a terminal display screen on the photographing preview interface;

the mark generating module comprises a touch mark generating submodule arranged to generate the mark information according to the touch information of the user on the terminal display screen;

the mark display module comprises a touch mark display submodule arranged to display the mark information at a position touched by the user on the photographing preview interface, wherein the touch mark generating submodule comprises a track mark generating submodule or a first feature mark generating submodule; the touch mark display submodule correspondingly comprises a track mark display submodule or a first feature mark display submodule, the track mark generating submodule is arranged to take a touch track as the mark information when the touch information comprises the touch track by the user on the terminal display screen; the track mark display submodule is arranged to display the mark information at a position touched by the user on the photographing preview interface;

the first feature mark generating submodule is arranged to, when the touch information comprises the touch track by the user on the terminal display screen, determine a touch selection area of the user according to the touch track by the user on the terminal display screen, extract first feature information of an image displayed in the touch selection area of the user, and generate mark information according to the first feature information; the first feature mark display submodule is arranged to display the mark information at the position touched by the user on the photographing preview interface.

6. The photographing device according to claim 5, wherein the touch mark generating submodule comprises a graphic mark generating submodule; the touch mark display submodule correspondingly comprises a graphic mark display submodule;

the graphic mark generating submodule is arranged to take a mark graphic selected by the user as the mark information when the touch information comprises the mark graphic selected by the user and a position where the user places the mark graphic; the graphic mark display submodule is arranged to display the mark graphic at the position where the user places the mark graphic on the photographing preview interface.

7. The photographing device according to claim 5, wherein, the request receiving module comprises a freeze request receiving submodule, the freeze request receiving submodule is arranged to receive a request of the user freezing image information obtained by a camera;

the mark generating module comprises a second feature mark generating submodule arranged to freeze the image information obtained by the camera according to the request, obtain second feature information from the frozen image information, and generate the mark information according to the second feature information; the mark display module comprises a second feature mark display submodule arranged to display the mark information at the corresponding position on the photographing preview interface.

8. The photographing device according to claim 5, wherein, the photographing device further comprises hardware performing instructions stored in a non-transitory computer readable medium which executes steps in following module: a calculating module arranged to calculate an overlap ratio between an image in the specific photographing area in an image obtained by the camera and the mark information, and inform the user of executing photographing or triggering a terminal to start photographing when a value of the overlap ratio exceeds a preset value.

9. A photographing terminal, comprising hardware performing instructions stored in a non-transitory computer readable medium which executes steps in following modules:
an image obtaining module arranged to obtain image information;
a display module arranged to display the image information on a photographing preview interface;
a receiving module arranged to receive a request of a user for marking a specific photographing area of the photographing preview interface, and send the request to the processing module after receiving the request;
a processing module arranged to generate mark information according to the request, and send the mark information to the display module;
the display module is further arranged to display the mark information at a corresponding position on the photographing preview interface;
the receiving module is further arranged to receive a photographing instruction, and inform the processing module of executing a photographing operation after receiving the photographing instruction,
wherein, the receiving module comprises a touch receiving submodule; the display module comprises a touch display screen, the touch receiving submodule is arranged to receive touch information of the user touching the touch display screen on the photographing preview interface; the processing module is arranged to generate the mark information according to the touch information of the user on the touch display screen and send the mark information to the display module; and the display module is arranged to display the mark information at a position touched by the user on the photographing preview interface, wherein the processing module comprises a track mark generating submodule or a first feature mark generating submodule; the display module correspondingly comprises a track mark display submodule or a first feature mark display submodule,
the track mark generating submodule is arranged to take a touch track as the mark information when the touch information comprises the touch track by the user on the touch display screen; the track mark display submodule is arranged to display the mark information at a position touched by the user on the photographing preview interface;
the first feature mark generating submodule is arranged to, when the touch information comprises the touch track by the user on the touch display screen, determine a touch selection area of the user according to the touch track by the user on the touch display screen, extract first feature information of an image displayed in the touch selection area of the user, and generate mark information according to the first feature information; the first feature mark display submodule is arranged to display the mark information at the position touched by the user on the photographing preview interface.

10. The photographing method according to claim 2, wherein, after displaying the image information obtained by the camera and the mark information on the photographing preview interface at the same time and before receiving the photographing instruction, the method further comprises: calculating an overlap ratio between an image in the specific photographing area in an image obtained by the camera and the mark information, and informing the user of carrying out photographing or triggering a terminal to start photographing when a value of the overlap ratio exceeds a preset value.

11. The photographing method according to claim 3, wherein, after displaying the image information obtained by the camera and the mark information on the photographing preview interface at the same time and before receiving the photographing instruction, the method further comprises: calculating an overlap ratio between an image in the specific photographing area in an image obtained by the camera and the mark information, and informing the user of carrying out photographing or triggering a terminal to start photographing when a value of the overlap ratio exceeds a preset value.

12. The photographing device according to claim 6, wherein, the photographing device further comprises hardware performing instructions stored in a non-transitory computer readable medium which executes steps in following module: a calculating module arranged to calculate an overlap ratio between an image in the specific photographing area in an image obtained by the camera and the mark information, and inform the user of carrying out photographing or triggering a terminal to start photographing when a value of the overlap ratio exceeds a preset value.

13. The photographing device according to claim 7, wherein, the photographing device further comprises hardware performing instructions stored in a non-transitory computer readable medium which executes steps in following module: a calculating module arranged to calculate an overlap ratio between an image in the specific photographing area in an image obtained by the camera and the mark information, and inform the user of carrying out photographing or triggering a terminal to start photographing when a value of the overlap ratio exceeds a preset value.

* * * * *